Patented May 30, 1933

1,911,400

UNITED STATES PATENT OFFICE

WALTER B. SCHULTE, OF MADISON, WISCONSIN, ASSIGNOR TO BURGESS BATTERY COMPANY, OF MADISON, WISCONSIN, A CORPORATION OF WISCONSIN

STARCH COATING COMPOSITION

No Drawing. Original application filed July 6, 1928, Serial No. 290,885. Divided and this application filed November 8, 1929. Serial No. 405,848.

This invention relates to coating and coating compositions, and more particularly to a coating composition formed by a starch suspension in water, the method for making such suspension, and a product made with such starch suspension.

This application is a division of my co-pending application Serial No. 290,885 filed July 6, 1928; and the claims of this application are directed to a dry cell partition having a coating of the coating composition herein described.

In the present invention I provide a suspension of starch in water which may be used to coat objects with a uniform layer of adherent and tough ungelatinized starch, and which is particularly useful in coating paper dry cell liners.

In the manufacture of a dry cell of the paper-lined type it is desirable to have an even coating of starch or other gelatinizable cereal on such paper liners prior to the assembling of the cells. Because of the manufacturing difficulties caused by gelatinized starch, the cereal is not gelatinized before the assembling of the cell. The gelatinized starch is sticky and slippery and difficult to apply evenly to the liner. After the cell is assembled the gelatinizable cereal is gelatinized by the zinc chloride in the cell.

It is difficult, however, to form a suspension of ungelatinized starch in water, due to its tendency to settle. I have discovered a method of suspending such cereal in water so that there is little tendency for settling and the suspension formed will coat dry cell liners evenly with a hard coating which may be handled during manufacturing operations.

Throughout the specification and claims I use starch in its generic sense and include all starch containing powders which gelatinize on cooking, on contact with zinc chloride, but not in cold water. Such materials may be substituted for corn starch in dry cell manufacture.

When a starch is suspended in cold water the suspension must be constantly agitated to prevent the starch from settling out. If a sheet of porous paper or other bibulous liner, such as is used in certain types of dry cells, is dipped into such a suspension, it becomes coated with a layer of starch. On drying, the starch rubs off easily because of the absence of a binder and absence of gelatinization of the starch in cold water. A liner coated in this way is objectionable for dry cell manufacture.

I have discovered that it is possible to make a mobile stable suspension of starch in water by having a small amount of suitable colloid, such as gelatinized starch, present in the water suspension. The colloid prevents the rapid settling of the suspension and binds the particles together on the dipped article so that the dried coating is firm and may be handled. The dip is liquid in nature and is not pasty.

To make the starch suspension I first make a water solution of a colloid which is mobile at ordinary temperature. Glue and agar-agar may be used for this purpose, but I prefer to use gelatinized starch. The starch may be gelatinized in a number of ways, but I prefer to gelatinize it by water heated to near boiling. The colloid solution should not contain more than 2% of the gelatinized starch or it becomes too thick and pasty for use. I prefer using between 0.5% and 1.5% of gelatinized starch and in one embodiment of my invention I use about 0.7%.

After the starch is gelatinized the solution is cooled to room temperatures and the starch to be suspended is stirred in thoroughly. From 30% to 55% of corn starch gives a range of suspension which may be used for dipping dry cell liners or it may be used to dip cores as described in the co-pending application Serial No. 290,761, filed July 6, 1928, of my co-worker, Wayne B. Staley (now Patent No. 1,760,090, granted May 27, 1930). I prefer using a solution containing from 35% to 45% of starch when dipping dry cell liners therein, such liners consisting of sheets of soft absorbent paper. The water and colloid suspending solution preferably contains from 0.5% to 1.5% of colloid such as gelatinized starch. Part of the starch may be replaced by glue, for example: A suspension containing 35% to 45% of starch may contain 0.2% to 0.4% of gelatinized starch and 0.7% to 0.5% of glue.

I have further found that if ammonium chloride is dissolved in the water containing the colloid and suspended starch, it decreases the viscosity of the colloid solution so that it becomes possible to suspend a greater quantity of starch therein without having the suspension become pasty. In a suspension containing from 30% to 55% of raw starch and 0.5% to 1.5% of gelatinized starch, it is possible to dissolve from 5% to 15% ammonium chloride. This ammonium chloride is necessary in a dry cell and thus it becomes possible to introduce it at an advantageous place.

The starch thus introduced into a dry cell is eventually gelatinized by the zinc chloride introduced into or formed by the reaction in the cell. Ordinary corn starch is somewhat more resistant to gelatinization by zinc chloride than flour, potato starch, and some other starches. In order to hasten this gelatinization after the cell is assembled, it has been found advantageous to add a small amount of zinc chloride to the starch suspension. The amount is too small to cause gelatinization, usually about 3 percent.

The paper or other bibulous dry cell liner is dipped into the starch suspension and then allowed to set sufficiently so that the coating hardens enough so that it may be handled. The setting usually results from the soaking of the water into the bibulous base. The starch granules are held firmly together by the colloid binder so that the coating does not dust or break off. The coated bibulous sheet is then introduced into the cell.

For dipping dry cell cores as described in the Staley co-pending application the preferred range is from 45% to 50% starch in a water solution containing from 0.5% to 1.5% of gelatinized starch, preferably about 0.7%. The suspending solution may contain dissolved ammonium chloride.

Throughout the specification the percentages given are based on the total final mixture of water, colloid, suspended starch and any other dissolved salts which may be added. "Liquid" suspension is used to desscribe a mobile fluid as distinguished from a pasty mass which could not be used for coating purposes by the dipping method.

I claim:
1. As a new article of manufacture, a dry cell paper liner having a coating comprising ungelatinized starch and a colloid binder.
2. As a new article of manufacture, a dry cell paper liner having a coating comprising ungelatinized starch and a gelatinized starch binder.
3. As a new article of manufacture, a dry cell paper liner having a coating comprising ungelatinized starch, and a mixed gelatinized starch and glue binder.

In testimony whereof I affix my signature.

WALTER B. SCHULTE.